(12) United States Patent  
Tsukamoto et al.

(10) Patent No.: US 9,269,956 B1  
(45) Date of Patent: Feb. 23, 2016

(54) HIGH ENERGY DENSITY METAL-OXYGEN BATTERY

(75) Inventors: Hisashi Tsukamoto, La Canada Flintridge, CA (US); Ryo Tamaki, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1409 days.

(21) Appl. No.: 12/800,420

(22) Filed: May 13, 2010

Related U.S. Application Data

(60) Provisional application No. 61/216,358, filed on May 15, 2009, provisional application No. 61/336,095, filed on Jan. 14, 2010.

(51) Int. Cl.
  *H01M 4/13* (2010.01)
  *H01M 4/62* (2006.01)
  *H01M 12/06* (2006.01)
  *H01M 6/30* (2006.01)
  *H01M 4/38* (2006.01)

(52) U.S. Cl.
  CPC ........ *H01M 4/62* (2013.01); *H01M 4/38* (2013.01); *H01M 6/30* (2013.01); *H01M 12/06* (2013.01)

(58) Field of Classification Search
  USPC .................................................... 429/231.95
  See application file for complete search history.

(56) References Cited

U.S. PATENT DOCUMENTS

| | | | | |
|---|---|---|---|---|
| 4,803,134 | A * | 2/1989 | Sammells | 429/103 |
| 2003/0162095 | A1 * | 8/2003 | Huang et al. | 429/246 |
| 2006/0088767 | A1 * | 4/2006 | Li et al. | 429/231.95 |
| 2007/0117007 | A1 * | 5/2007 | Visco et al. | 429/144 |
| 2008/0044725 | A1 * | 2/2008 | Sadoway et al. | 429/149 |

OTHER PUBLICATIONS

Kang Xu, Chem. Rev. 2004, 104, 4303-4417, "Nonaqueous Liquid Electrolytes for Lithium-Based Rechargeable Batteries".*

* cited by examiner

*Primary Examiner* — Jennifer A Smith
*Assistant Examiner* — Anita Nassiri Motlagh
(74) *Attorney, Agent, or Firm* — Gavrilovich, Dodd & Lindsey, LLP

(57) ABSTRACT

The battery includes a cathode configured to generate oxygen ions during discharge of the battery. The battery also includes an oxygen ion-conducting electrolyte that receives the oxygen ions from the cathode during discharge of the battery. The battery further includes an anode that has an anode active medium positioned in the pores of a porous anode current collector. The anode active medium receives the oxygen ions conducted through the oxygen ion conducting electrolyte during discharge of the battery. Additionally, the anode active medium includes an elemental metal that reacts with the oxygen ions to form a metal oxide during discharge of the battery.

20 Claims, 5 Drawing Sheets

HIGH ENERGY DENSITY METAL-OXYGEN BATTERY

RELATED APPLICATIONS

This Application claims the benefit of U.S. Provisional Patent Application Ser. No. 61/216,358, filed on May 15, 2009, entitled "High Energy Density Metal-Oxygen Battery," and incorporated herein in its entirety; and this Application claims the benefit of U.S. Provisional Patent Application Ser. No. 61/336,095, filed on Jan. 14, 2010, entitled "High Energy Density Metal-Oxygen Battery," and incorporated herein in its entirety.

FIELD

The present invention relates to power sources and more particularly to batteries and hybrid batteries.

BACKGROUND

Metal-oxygen batteries can provide large energy levels because the active material in the cathode (oxygen) can be provided indefinitely from air. Current metal-air batteries require a counter anion to capture the metal ions that are generated during discharge of the battery. An example of a common counter ion is hydroxide generated by reduction of a catholyte such as water. Another common catholyte is ammonium chloride. The batteries that employ these catholyte typically include a reservoir of the catholyte. The reservoir and catholyte increase the size and weight of the battery and accordingly decrease the energy density of the battery. As a result, there is a need for a metal-oxygen battery having a reduced energy density.

SUMMARY

The battery includes a cathode configured to generate oxygen ions during discharge of the battery. The battery also includes an oxygen ion conducting electrolyte that receives the oxygen ions from the cathode during discharge of the battery. The battery further includes an anode that has an anode active medium positioned in the pores of a porous anode current collector. The anode active medium receives the oxygen ions conducted through the oxygen ion conducting electrolyte during discharge of the battery. Additionally, the anode active medium includes an elemental metal that reacts with the oxygen ions to form a metal oxide during discharge of the battery.

In some instances, the anode active medium is a liquid and the oxygen ion-conducting electrolyte is a solid. The elemental metal can include or consist of lithium metal.

In some instances, the elemental metal is included in a solution that also includes one or more melting point reducers. The melting point reducers are selected to reduce the melting point of the metal oxide in the solution below the melting point that the metal oxide would have in the solution if the one or more melting point reducers were not present in the solution.

DESCRIPTION

Figure 1A:
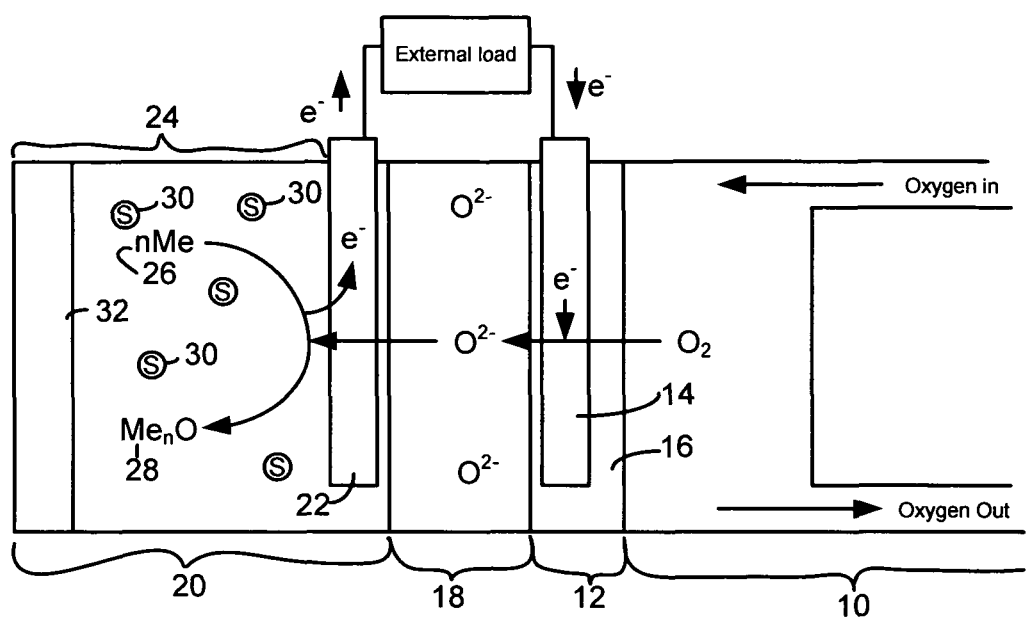
FIG. 1A illustrates the operation of the battery.

A battery includes a cathode that generates oxygen ions during the discharge of the battery. In some instances, the cathode is configured to generate these ions from air and electrons received from a cathode current collector. The battery also includes an oxygen ion-conducting electrolyte that receives the oxygen ions from the cathode. The battery also includes an anode that includes an anode active medium that receives the oxygen ions conducted through the electrolyte. The anode active medium can include one or more elemental metals. The one or more elemental metals give up electrons to an anode current collector and the resulting metal ion reacts with the oxygen ions during the discharge of the battery to form a metal oxide. In view of these reactions, an additional reactant is not needed at the cathode. As a result, the battery does not need a catholyte or reservoir for storing the catholyte. The absence of the catholyte and reservoir can increase the mass-based energy density of the battery.

The one or more elemental metals can include or consist of metal that is molten at the operating temperature of the battery. The use of molten elemental metal can permit the elemental metal to directly contact the solid oxygen ion conducting electrolyte rather than relying on an additional liquid component between the anode active medium and a solid oxygen ion-conducting electrolyte. The elimination of this additional component can further increase the mass-based energy density of the battery. An example of an elemental metal that is a liquid at the operating temperature of the battery is lithium metal.

Since a metal oxide is formed at the anode, this metal oxide could deposit on the surface of the electrolyte and/or on the surface of the current collector. Deposition of metal oxide on the surface of the electrolyte and/or on the surface of the current collector can reduce the access of the one or more elemental metals to the oxygen ions and can accordingly increase the internal impedance of the battery and possibly stop the reactions at the anode. In one embodiment, the anode current collector is porous and the anode active medium is positioned in the pores of the anode current collector. Placement of the anode active medium in the pores of the anode current collector can increase the area over which the anode active medium is interfaced with the anode current collector above the area that can be achieved when a non-porous anode current collector is used. The increased interface area reduces the effects of the metal oxide being deposited on a surface of the anode current collector and/or the electrolyte. For instance, by increasing the surface area of the anode current collector, the elemental metal can continue access the oxygen ions from the anode current collector after the formation of metal oxide on the surface of the anode current collector would previously reduced the accessibility of the oxygen ions to the elemental metal. Accordingly, the porous anode current collector can provide a reduced internal resistance.

Further, the one or more elemental metals can include or consist of lithium metal. As a result, lithium oxide and lithium ions are formed at the anode. Lithium oxide is highly conductive of these lithium ions. As a result, the lithium ions are easily conducted through the lithium oxide so it can continue to react with the oxygen ions. As a result, the use of the lithium metal in combination with the oxygen ions provides a reduced internal resistance. Other elemental metals may provide the advantages associated with the use of lithium metal. Additionally or alternately, the use of lithium metal as one of the elemental metals can enhance the energy density of the battery as a result of the high capacity of lithium metal (about 3860 Ah/kg). Further, the lithium metal can be in direct contact with the ion-conducting electrolyte.

FIG. 1A is a schematic of the battery. The direction of electron (e) flow illustrated in FIG. 1A is during discharge of the battery. The direction of the electron flow is reversed upon charging of the battery.

The battery of FIG. 1A includes an oxygen source 10. Suitable oxygen sources include, but are not limited to, air and/or can be the ambient atmosphere in which the battery is placed. The battery also includes a cathode 12 that receives the oxygen from the oxygen source 10. The cathode 12 includes a cathode current collector 14 and a cathode active medium 16. During discharge of the battery, the cathode 12 reduces the oxygen received from the oxygen supply. Accordingly, the cathode 12 is configured to generate oxygen ions ($O^{2-}$) using electrons that travel through the cathode current collector 14. Suitable cathode current collectors 14 include, but are not limited to, silver, nickel based metal alloy, and ferritic stainless steel. Suitable cathode active media 16 include, but are not limited to, lanthanum strontium manganite.

The battery includes an oxygen ion-conducting electrolyte 18 that receives the oxygen ions generated by the cathode 12. The oxygen ion-conducting electrolyte 18 can be a solid at the operating temperature of the battery. For instance, suitable oxygen ion-conducting electrolytes 18 include, but are not limited to, yttrium stabilized zirconia, samarium doped ceria, and/or gadolinium doped ceria. The battery includes an oxygen ion-conducting electrolyte 18 that receives the oxygen ions generated by the cathode 12.

The battery also includes an anode 20. The anode 20 includes an anode current collector 22 and an anode active medium 24. During discharge of the battery, the anode 20 receives the oxygen ions from the oxygen ion-conducting electrolyte 18. The anode active medium 24 includes or consists of one or more metals in their elemental form (elemental metal 26). The anode active medium 24 can be a liquid at the operating temperature of the battery. For instance, the one or more elemental metals 26 can be molten at the operating temperature of the battery. During discharge, the elemental metal 26 forms elemental metal ions. For instance, the elemental metal 26 gives up electrons that are carried by the anode current collector 22. The resulting elemental metal ions react with the oxygen ions received from the oxygen ion-conducting electrolyte 18 to form a metal oxide 28.

Figure 1B:
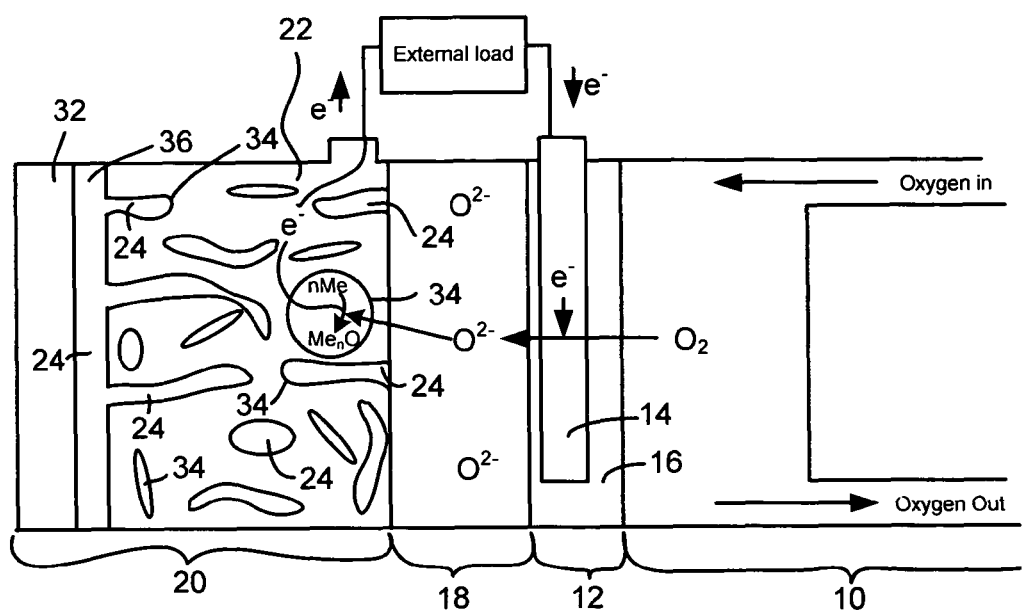
FIG. 1B illustrates operation of another embodiment of the battery.

In some instances, the anode active medium is positioned in the pores of a porous anode current collector. For instance, FIG. 1B illustrates the battery of FIG. 1A where the anode current collector includes pores 34 and the anode active medium 24 is positioned in the pores 34. During the discharge of the battery, the anode 20 receives the oxygen ions from the oxygen ion-conducting electrolyte 18. The oxygen ions can be conducted through the anode current collector 22 and be received by anode active medium 24 in the pores 34. Alternately, the anode active medium 24 can receive the oxygen ions directly from the oxygen ion-conducting electrolyte 18. For instance, all or a portion of the pores 34 can be open to the oxygen ion-conducting electrolyte 18 as shown in FIG. 1B. The anode active medium 24 in these open pores can contact the ion-conducting electrolyte 18. Accordingly, the oxygen ions can travel from the oxygen ion-conducting electrolyte 18 directly into the anode active medium 24. During discharge, the one or more elemental metals in the anode active medium 24 generate elemental metal ions. For instance, the elemental metal 26 gives up electrons that are carried by the anode current collector 22. The resulting elemental metal ions react with the oxygen ions received from the oxygen ion-conducting electrolyte 18 to form a metal oxide 28.

As is evident from FIG. 1B, the electrons generated from the one or more elemental metals 26 travel through the anode current collector 22 to a terminal of the battery. As a result, the anode current collector 22 can be configured to provide a continuous path that the electrons can travel from the pore 34 where the electron is generated to a terminal of the battery.

The battery can include a reservoir 36 of the anode active medium 24. The anode active medium 24 can contact the anode current collector 22. As is evident from FIG. 1B, all or a portion of the pores 34 can be open to the reservoir 36. As a result, when the anode active medium 24 is a liquid or gel, the anode active medium 24 can enter the pores 34 of the anode current collector 22 from the reservoir 36.

The reservoir is optional and need not be included in the battery.

Although FIG. 1B illustrates the pores as being irregularly spaced and shaped, the pores need not be irregularly spaced and shaped. For instance, a suitable porous current collector can include multiple pores that each have about the shape. As an example, the pores can each be drilled to about the same depth in a non-porous substrate. Additionally or alternately, a suitable porous current collector can include multiple pores that are regularly spaced such as pores having grid, matrices, or lattice spacing. As an example, the pores can each be drilled into a non-porous substrate in a grid pattern.

A suitable porosity for a porous current collector includes, but is not limited to, a porosity greater than 10%, 20%, or 30%, and/or less than 90%, 80%, or 70%. A suitable average diameter for the pores include, but are not limited to, an average diameters greater than 1 nm, 10 nm, or 1000 nm, and/or less than 10 mm, 5 mm, or 1 mm. Further, a suitable average length for the pores include, but are not limited to, an average lengths greater than 1 nm, 10 nm, or 1000 nm, and/or less than 10 mm, 5 mm, or 1 mm.

The metal oxide 28 formed at the anode 20 can be a solid at the operating temperature of the battery. For instance, when the one or more elemental metals 26 includes or consists of lithium metal, the metal oxide 28 that forms in lithium oxide ($Li_2O$). Lithium oxide has a melting point of about 1567° C. and lithium metal has a melting point of around 180° C. while the operating temperature of the battery can be at temperatures around 500-900° C. As a result, the metal oxide 28 formed at the anode 20 can be a solid during the operation of the battery while the elemental metal is a liquid. This solid metal oxide 28 can deposit on the surface of the oxygen ion-conducting electrolyte 18 and/or the anode current collector. This deposition of the solid metal oxide 28 can increase the internal resistance of the battery. However, when the one or more elemental metals 26 are molten at the operating temperature of the battery, the liquid can convect the resulting metal oxide 28 away from the surface of the oxygen ion conducting electrolyte 18 as illustrated by the arrow in FIG. 1A. The convection of the resulting metal oxide 28 away from the oxygen ion-conducting electrolyte 18 can reduce or prevent the increase in internal resistance associated with deposition of the metal oxide 28 on the oxygen ion-conducting electrolyte 18.

The anode active medium 24 can optionally include one or more melting point reducers 30 in solution with the one or more liquid elemental metals 26. Melting point reducers 30 can take advantage of the eutectic effect to reduce the melting point of the metal oxide 28 formed in the anode 20 during discharge of the battery. For instance, certain metal oxides 28 (called secondary metal oxides below) and metal halides can reduce the melting point of the metal oxides 28 formed at the anode 20. As an example, the anode active medium 24 can be a solution that includes the combination of lithium metal and a secondary metal oxide such as boron oxide ($B_2O_3$). This solution can reduce the melting point of lithium oxide from around 1500° C. to around 500° C. As a result, when the temperature of the battery is above 500° C., the lithium oxide does not form as a solid but instead stays in solution with the lithium metal and boron oxide. Accordingly, the melting point reducers 30 can reduce or prevent the increase in internal resistance associated with deposition of the metal oxide 28 on the oxygen ion conducting electrolyte 18.

Suitable melting point reducers 30 act in combination with the one or more liquid elemental metals 26 to reduce the melting point of the metal oxide 28 formed at the cathode 12. Examples of melting point reducers 30 include, but are not limited to, metal oxides 28 such as boron oxide ($B_2O_3$) and/or phosphorus oxide ($P_2O_5$) and/or metal halides such as lithium chloride and/or potassium chloride. During charging of the battery, secondary metal oxides such as boron oxide ($B_2O_3$) and/or phosphorus oxide ($P_2O_5$) are less likely to reduce back to their metal form because the reduction potential of these secondary metal oxides is generally higher than the reduction potential of the metal oxides 28 formed at the anode 20 such as lithium oxide. Further, because of the reduction potentials associated with these secondary metal oxides, during discharge of the battery, the secondary metal oxides would preferentially re-form over the metal oxides 28 formed at the anode 20. As a result, these secondary metal oxides will be present in the anode active material during the discharge of the battery.

The one or more melting point reducers 30 are present in the anode active material at a concentration that takes advantage of the eutectic effect or forms a eutectic solution. For instance, the level of melting point reduction for the metal oxide 28 is a function of the ratio of the one or more melting point reducers 30, the one or more liquid elemental metals 26 and the metal oxide 28. However, the concentration of the metal oxide 28 formed at the anode 20 changes during discharge of the battery. For instance, the concentration of the metal oxide 28 at the anode 20 increases during discharge of the battery. As a result, the concentration of the one or more melting point reducers 30 can be selected to achieve a particular metal oxide 28 melting point at a particular stage in the discharge of the battery. Increasing the concentration of the one or more melting point reducers 30 can reduce the mass-based energy density of the battery. As a result, the desired concentration of the one or more melting point reducers 30 may need to be balanced against the possibility of a reduction in the mass-based energy density.

As noted above, in some instances, the one or more elemental metals 26 include or consist of lithium metal which forms lithium oxide during the discharge of the battery. Lithium oxide is highly conductive of lithium ions. As a result, the lithium ions are easily conducted through the lithium oxide in order to react with the oxygen ions. As a result, the use of lithium metal can reduce negative effects from lithium oxide depositing on the oxygen ion-conducting electrolyte 18. Additionally, the use of lithium metal as one of the elemental metals 26 can enhance the energy density of the battery as a result of the high capacity of lithium metal (about 3860 Ah/kg). Further, the lithium metal can be in direct contact with the oxygen ion-conducting electrolyte 18.

The anode active medium 24 can optionally include one or more solids 32 in addition to the one or more liquid elemental metals 26. The one or more liquid elemental metals 26 can be located between the one or more solids 32 and the oxygen ion-conducting electrolyte 18 as is illustrated in FIG. 1A and FIG. 1B. In some instances, the one or more liquid elemental metals 26 is located between the one or more solids 32 and the oxygen ion-conducting electrolyte 18 without the solid 32 contacting the oxygen ion-conducting electrolyte 18. This arrangement permits the liquid portion of the anode active medium 24 to continue function as described above with respect to the metal oxide 28 formed at the anode 20.

Examples of suitable solids 32 for inclusion in the anode active medium 24 are metal alloys. Suitable metal alloys include, but are not limited to, lithium metal alloys. Examples of suitable alloys include, but are not limited to, lithium-aluminum alloy, lithium-silicon alloy, and lithium-silicon-iron alloy. The solid 32 can act as an active material in the anode 20 or can act as an inactive material.

Suitable anode current collectors 20 include, but are not limited to, nickel, nickel oxide-gadolinium doped ceria, nickel oxide-samarium doped ceria, nickel oxide-yttrium stabilized zirconia or a combination of above. In some cases, one or more elemental metals 26 can serve as both the current collector and the one or more elemental metals 26 in the anode active medium 24. As a result, the anode active medium 24 and the anode current collector 22 need not be separate components.

The reactions at the anode 20 and cathode 12 of FIG. 1A and/or FIG. 1B can be illustrated as follows:

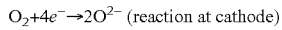

$O_2 + 4e^- \rightarrow 2O^{2-}$ (reaction at cathode)

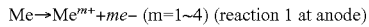

$Me \rightarrow Me^{m+} + me-$ (m=1~4) (reaction 1 at anode)

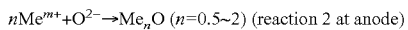

$nMe^{m+} + O^{2-} \rightarrow Me_nO$ (n=0.5~2) (reaction 2 at anode)

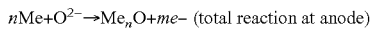

$nMe + O^{2-} \rightarrow Me_nO + me-$ (total reaction at anode)

$nMe + \frac{1}{2}O_2 \rightarrow Me_nO$ (total reaction).

In both FIG. 1A, FIG. 1B, and the above reactions, Me represents a metal, the variable m can be greater than 1 and/or less than 4 and in some instances m=1~4, and the variable n can be greater than 0 or 0.5 and/or less than 2 or 4 and in some instances m=0.5~2. The metal can be a monovalent elemental metal 26 such as lithium. However, the battery can be operated with elemental metals 26 that are not monovalent. Examples of metals that are suitable for use as the elemental metal 26 includes, but is not limited to, sodium, potassium, magnesium, calcium, and zinc.

The battery can be operated at elevated temperatures. For instance, the battery can be operated at temperatures at or above about 500° C. and is generally operated at temperatures greater than 650° C., 750° C., 850° C., and/or 750° C., 850° C. Accordingly, the battery can include a heater (not shown). Alternately, the battery can be positioned in a location where the ambient atmosphere causes the battery to be heated to the desired temperature. For instance, the battery can be positioned so the battery is exposed to the exhaust of an aircraft. In some instances, once battery discharge is achieved at the operational temperature, the battery can generate enough internal heat to maintain itself at the operational temperature.

The reactions illustrated in FIG. 1A and FIG. 1B are reversible. As a result, the battery can be re-charged and can operate as a secondary battery.

Figure 2:
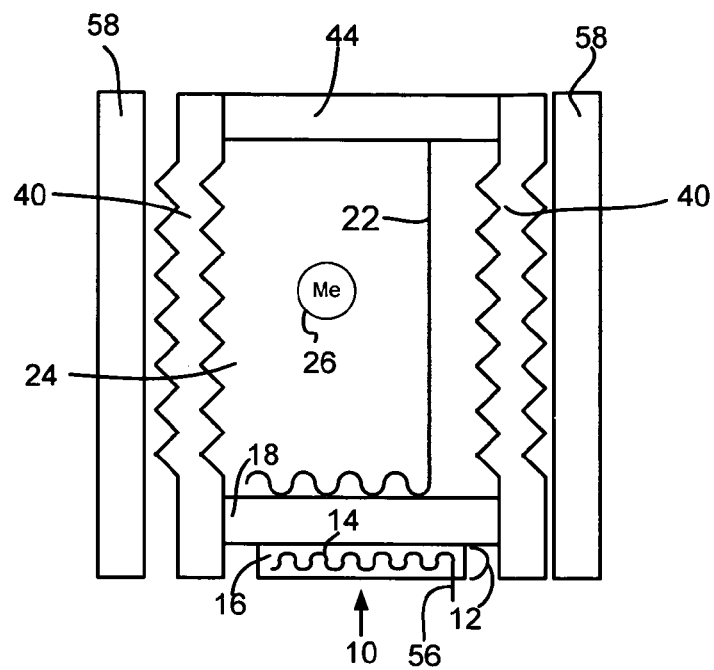
FIG. 2 illustrates a possible construction of the battery.

FIG. 2 illustrates an example of a suitable battery construction. The battery includes a case 40. The anode active material is positioned in an interior of the case 40. The anode active material changes volume during the use of the battery. For instance, as is evident from the above discussion, oxygen enters the anode active material during the formation of the metal oxide 28 that occurs during discharge of the battery. Additionally, oxygen exits from the anode active material during charging of the battery. This change in the amount of oxygen causes the volume of the anode active material to change. In order to compensate for these changes in volume, the case 40 can be constructed so the interior volume of the case 40 can be expanded and/or contracted. For instance, the case 40 of FIG. 2 has a bellows construction. As is evident from the above discussion, the amount of metal oxide 28 in the battery increases during discharge of the battery. The increased level of metal oxide 28 increases the volume of the battery interior. The bellows shape allows the case 40 volume to increase so as to compensate for the increased volume of metal oxide 28. Additionally, the amount of metal oxide 28 in the battery decreases during discharge of the battery. The decreased volume of metal oxide 28 decreases the volume of the battery interior. The bellows shape allows the case 40 volume to decrease to match the decreased amount of metal oxide 28.

Figure 3:
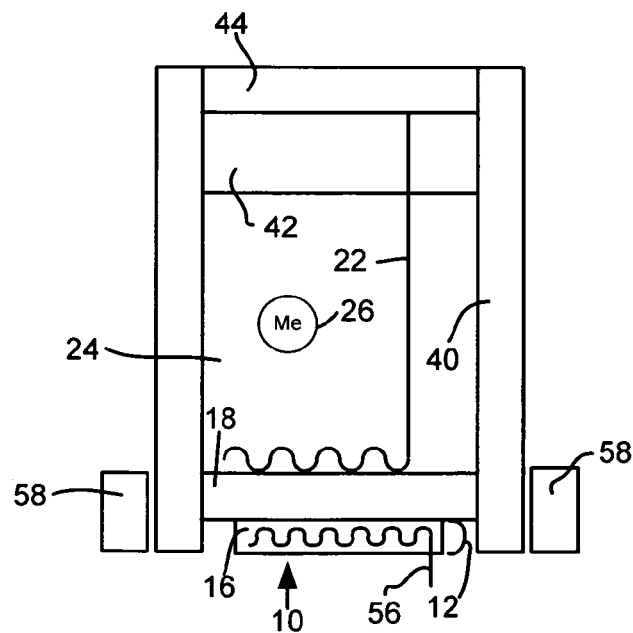
FIG. 3 illustrates another possible construction of the battery.

An alternative to a case 40 having a bellows construction is illustrated in FIG. 3. The case 40 of FIG. 3 includes a reservoir 42 of a gas. The reservoir 42 is constructed such that the gas is compressed during the expansion of the anode active material and expands during contraction of the anode active material. Accordingly, the volume of the reservoir 42 can decrease during the expansion of the anode active material and increase during contraction of the anode active material. A suitable gas for inclusion in the reservoir 42 includes, but is not limited to, Argon.

Figure 4:
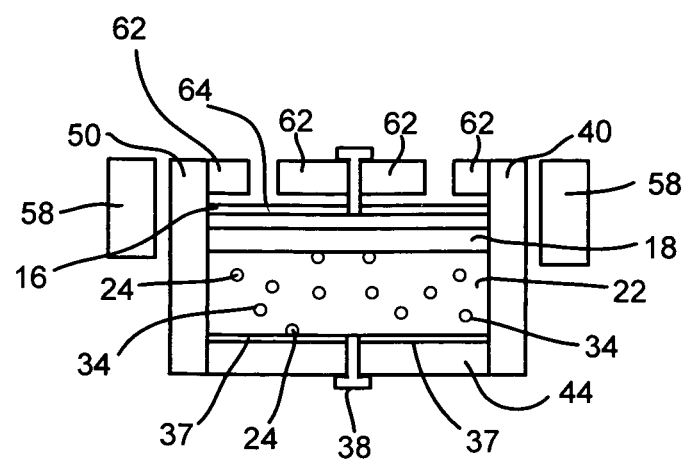
FIG. 4 illustrates another possible construction of the battery.

FIG. 4 illustrates an example of a suitable battery construction for a battery constructed according to FIG. 1B. The battery includes a case 40. The anode includes a porous anode current collector 22 with the anode active medium 24 positioned in the pores 34. The anode includes an anode adhesion layer 37 in contact with the anode current collector 22. The anode adhesion layer 37 can act as an adhesive between a secondary anode current collector 38 and the anode current collector 22. The anode adhesion layer 37 can be electrically conductive and can also provide some current collection functionality. The secondary anode current collector 38 can serve as a terminal for the battery. In instances where sufficient electrical contact can be achieved between the secondary anode current collector and the anode current collector, the anode adhesion layer 37 is optional.

The battery shown in FIG. 4 excludes the reservoir 36 disclosed in the context of FIG. 1B. However, the battery of FIG. 4 can be modified to include the reservoir 36. For instance, a cover 44 seals a first end of the case 40. The cover 44 can be spaced apart from the anode current collector 22. The space between the cover 44 and the anode current collector 22 can serve as the reservoir 36.

In some instances, a battery having the construction of FIG. 4 does not require that the case have a bellows discussed above with respect to FIG. 2 and FIG. 3. However, a battery having the construction of FIG. 4 can employ a case with a bellows.

In FIG. 2 through FIG. 4 a cover 44 seals a first end of the case 40. In some instances, the cover 44 hermetically seals the first end of the case 40. The anode current collector 22 is in electrical communication with the cover 44. For instance, the anode current collector 22 of FIG. 2 and FIG. 3 can be welded to the cover 44. Alternately, the secondary anode current collector 38 of FIG. 4 can provide electrical communication between the anode current collector 22 and the cover 44. As a result, the cover 44, the secondary anode current collector 38, and/or the case 40 can serve as a terminal for the battery. In some instances, the anode current collector 22 or the secondary anode current collector 38 optionally extends through the cover 44. When the anode current collector 22 extends through the cover 44, a portion of the anode current collector 22 that is accessible from outside of the case 40 can serve as a terminal for the battery, the cover 44 can serve as the terminal, and/or the case 40 can serve as the terminal. When the secondary anode current collector 38 extends through the cover 44, the secondary anode current collector can optionally be welded to the cover.

Figure 5:
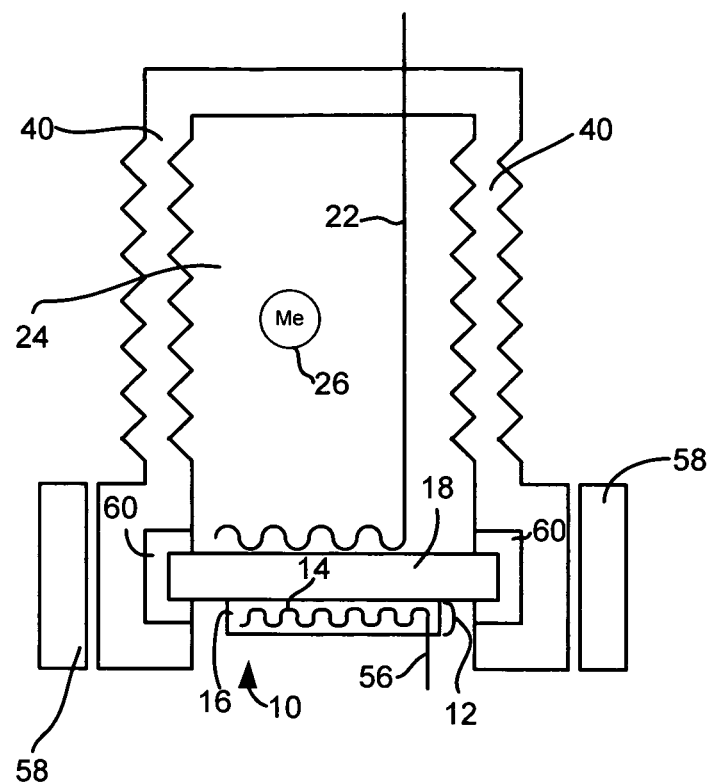
FIG. 5 illustrates another possible construction of the battery.

The cover 44 is optional. For instance, the case 40 can have a closed end as shown in FIG. 5.

A suitable material for the case 40 includes, but is not limited to, stainless steel, nickel, and nickel metal alloy. A suitable material for the cover 44 includes, but is not limited to, stainless steel, nickel, and nickel metal alloy.

The oxygen ion-conducting electrolyte 18 is positioned between the cathode 12 and the anode 20. The oxygen ion-conducting electrolyte 18 can contact the anode 20 and the cathode 12. In particular, the oxygen ion-conducting electrolyte 18 can contact the one or more elemental metals in the anode 20.

In some instances, such as shown in FIG. 2 and FIG. 3, the electrolyte 18 seals a second opening in the case 40. In some instances, the electrolyte 18 hermetically seals the second end of the case 40. A sealing material 60 can optionally be positioned between the case 40 and the oxygen ion conducting electrolyte 18 in order to seal the second opening as shown in FIG. 5. The sealing material can be a brazing material or a compression sealing material. As a result, the battery can be compression sealed. In some instances, such as shown in FIG. 4, a second cover 62 seals a second opening in the case 40. One or more openings can extend through the second cover 62 in order to provide the cathode active medium access to oxygen. A sealing material (not shown) can optionally be positioned between the case and the second cover 62 in order to seal the second opening. The sealing material can be a brazing material or a compression sealing material. As a result, the battery can be compression sealed. The sealing material can be an electrical insulator in order to insulate the second cover 62 from the case.

The cathode 12 and the cathode current collector 14 can be arranged such that they do not contact the case in order to prevent a short in the battery. For instance, the cathode 12 can be spaced apart from the case as illustrated in FIG. 2 through FIG. 3 and FIG. 5.

As shown in FIG. 2 through FIG. 4, the cathode current collector 14 can be arranged in the cathode 12 such that a portion of the cathode current collector 14 that is accessible from outside of the case 40 can serve as a terminal 56 for the battery. Although FIG. 2 and FIG. 3 illustrate the cathode current collector 14 included within the cathode active medium 16, the cathode current collector 14 can be positioned on the surface of the cathode active medium 16. For instance, as shown in FIG. 4, the cathode can include a cathode adhesion layer 64 in contact with the cathode active medium 16. The cathode adhesion layer 64 can act as an adhesive between the cathode current collector 14 and the cathode active medium 16. The cathode adhesion layer 64 can be electrically conductive and can also provide some current collection functionality. In instances where sufficient electrical contact can be achieved between the cathode current collector 14 and the cathode active medium 16, the cathode adhesion layer 64 is optional.

As noted above, the battery can be operated at elevated temperatures such as temperatures at or above about 600° C. The battery can optionally include components 58 for elevating the temperature of the battery to these levels. For instance, the battery can include components 58 for heating the battery. As an example, the battery can include tubes and/or conduits for carrying heated fluids and/or heating elements. Additionally or alternately, the case 40 can include can include tubes and/or conduits for carrying heated fluids and/or heating elements. In one example, the heating component 58 is an inductive heating coil. The heating component 58 can be positioned outside of the case and can be spaced apart from the case as shown in FIG. 2 or FIG. 3. Although FIG. 2 through FIG. 5 illustrate a heating component 58 being spaced apart from the case, a heating component 58 can contact the case and or be integrated into the walls of the case.

The heating components 58 are optional. In some instances, the battery can be elevated to the operational temperature by the environment in which the battery is placed. For instance, a battery constructed according to FIG. 2 or FIG. 3 can be placed in a location where the battery is exposed to the level of heat needed elevate the temperatures of the battery to the operational temperature. As an example, a battery constructed according to FIG. 2 or FIG. 3 can be placed in a location where the battery is exposed to the heat from aircraft exhaust.

A method of fabricating the battery includes forming a multi-layer sheet that includes the cathode 16 and electrolyte 18. An electrolyte slurry can be generated as a precursor for the sheet. The electrolyte slurry can be generated by mixing a powder for the electrolyte with a solvent and a binder. Suitable solvents include, but are not limited to, water and organic solvents such as alcohol. Suitable binders include, but are not limited to, poly(vinyl alcohol), polyacrylate and polyethylene glycol. A cathode slurry can also be generated as a precursor for the sheet. The cathode slurry can be generated by mixing a powder of the cathode active material with a solvent and a binder. Suitable solvents include, but are not limited to, water and organic solvents such as alcohol. Suitable binders include, but are not limited to, poly(vinyl alcohol), polyacrylate and polyethylene glycol.

The sheet can be generated by coating a substrate with the electrolyte slurry and drying the electrolyte solvent. The cathode slurry can then be coated on the dried electrolyte slurry. The result can then be calcinated to form the multi-layer sheet. Alternately, the sheet can be generated by coating a substrate with the electrolyte slurry and calcinating the electrolyte slurry. The cathode slurry can then be coated on the calcinated electrolyte slurry. The result can then be calcinated to form the multi-layer sheet. The resulting multi-layer sheet and the substrate can be separated. The calcination temperatures range from 700~1400° C. The size of cathode 16 can be smaller than the electrolyte 18 or the anode current collector as shown in FIG. 2 through FIG. 5. The cathode can be smaller than the electrolyte as a result of the process used to coat the cathode slurry on the dried electrolyte slurry or the calcinated electrolyte slurry.

The anode current collector 22 can be bonded to the anode side of the multi-layer sheet using anode contact paste such as nickel paste.

The above assembly can be placed on the case 40 so as to seal an opening in the case. The assembly can be bonded to the case using metal-alloy brazing material or by compress-sealed to the case along with the sealing material such as alumina felt, mica sheet, or vermiculite sheet. Both bonding methods can provide hermetic sealing.

The end of the anode current collector 22 can be welded to the cover 44. Suitable welds include, but are not limited to, resistive welds, sonic welds and laser welds.

The anode active media 24 is generated by feeding elemental metal 26 in an ingot, sheet or powder form into the case 40. After filling the case 40 with elemental metal 26, the cover 44 is welded to the other end of the case 40. Suitable welds include, but are not limited to, resistive welds, sonic welds, and laser welds. In some cases, the cover 44 can be compression-sealed to the case with a sealing material such as alumina felt, mica plate, or vermiculite sheet.

Another method of fabricating the battery includes forming a multi-layer sheet that includes the cathode 16, electrolyte 18, and anode 20. The method includes forming the porous anode current collector 22. The porous anode current collector 22 can be formed by generating a mixture that includes a powder of the material for the anode current collector 22 and a binder such as a polymer binder. Suitable binders include, but are not limited to, polyvinyl alcohol, sucrose, polyacrylate, and polymethacrylate. The binder is preferably present in the mixture in a range of about 5-80 wt %. The mixture can be used in techniques including extrusion, injection molding and/or pressing techniques such as die molding in order to form the mixture into the desired shape. The result can be sintered in order to fuse the powder of the material for the anode current collector. Additionally, the sintering removes the binder. The removal of the binder forms the pores in the anode current collector.

The oxygen ion-conducting electrolyte can be coated on the anode current collector. The coating can be formed by using an electrolyte slurry with an application technique such as spray pyrolysis coating, laser plasma coating, colloidal deposition coating, sol-gel coating, and dip-coating. The cathode active medium 16 can then be coated on the oxygen ion-conducting electrolyte using a cathode slurry with an application technique such as spray pyrolysis coating, laser plasma coating, colloidal deposition coating, sol-gel coating, and dip-coating.

After coating the cathode active medium 16 on the oxygen ion-conducting electrolyte 18, the anode active medium can be infused, absorbed and/or adsorbed into the pores 34 of the porous anode current collector. For instance, an oxide of the elemental metal can be infused into the pores of the porous anode current collector. The oxide can be infused into the pores by using techniques such as dipping the porous anode current collector into a suspension of the oxide of the elemental metal. Alternately, the oxide can be infused into the pores by using the metal alkoxide that corresponds to the porous anode current collector in combination with a sol-gel reaction. The infused oxide can be reduced to the elemental metal by exposing the porous anode current collector to hydrogen gas.

Alternately, the anode active medium can be infused, absorbed and/or adsorbed into the pores of the porous by using a liquid form of the anode active medium. The anode active medium can be infused, absorbed and/or adsorbed into the pores by soaking the porous current collector in the liquid anode active medium. Alternative for placing a liquid form of the anode active medium in the pores include spattering and physical vapor deposition. Combinations of two or more techniques selected from a group consisting of soaking, spattering, and physical vapor deposition can also be employed.

The anode adhesion layer 37 and the cathode adhesion layer 64 can be coated on the porous anode current collector 22. Suitable materials for the anode adhesion layer 37 include, but are not limited to, contact pastes and inks such as silver ink or anode ink. Suitable anode inks can have the same materials as the anode active medium combined with a binder such as a polymer binder. Suitable materials for the cathode adhesion layer include, but are not limited to, contact pastes and inks such as silver ink or cathode ink. Suitable cathode inks can have the same materials as the anode active medium combined with a binder such as a polymer binder.

The cathode current collector can be connected to the cathode active medium by using the cathode adhesion layer as an adhesive. Additionally, the anode conductor can be connected to the porous current collector by using the anode adhesion layer as an adhesive.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery, comprising:
a cathode configured to generate oxygen ions during discharge of the battery;
an oxygen ion conducting electrolyte positioned to receive the oxygen ions from the cathode during discharge of the battery, the oxygen ion conducting electrolyte being a solid at an operating temperature of the battery; and
an anode including an anode active medium positioned in the pores of a porous anode current collector such that the anode active medium receive the oxygen ions conducted through the oxygen ion conducting electrolyte during discharge of the battery,
the anode active medium including an elemental metal that reacts with the oxygen ions to form a metal oxide during discharge of the battery.

2. The battery of claim 1, wherein the anode active medium is a liquid at the operating temperature of the battery.

3. The battery of claim 1, wherein the porous current collector contacts the oxygen ion conducting electrolyte.

4. The battery of claim 1, wherein the anode active medium consists of the elemental metal.

5. The battery of claim 1, wherein the elemental metal includes lithium metal.

6. The battery of claim 1, wherein the elemental metal is one of a plurality of elemental metals included in the anode active medium.

7. The battery of claim 1, wherein the cathode is exposed to air.

8. The battery of claim 1, wherein:
the cathode is exposed to air;
the anode active medium includes liquid lithium; and
the oxygen ion conducting electrolyte contacts the porous current collector.

9. The battery of claim 1, wherein:
the anode active medium is a liquid at the operating temperature of the battery; and
the metal oxide is a solid at an operating temperature of the battery.

10. The battery of claim 1, wherein:
the anode active medium is a solution that includes one or more melting point reducers, the melting point reducers reducing the melting point of the metal oxide in the solution below the melting point that the metal oxide would have in the solution if the one or more melting point reducers were not present in the solution.

11. The battery of claim 10, wherein the one or more melting point reducers are present in the solution before the initial discharge of the battery.

12. The battery of claim 10, wherein at least one of the one or more melting point reducers is selected from a group consisting of secondary metal oxides and metal halides,
the secondary metal oxides being different from the metal oxide.

13. The battery of claim 12, wherein the secondary metal oxides are limited to boron oxide ($B_2O_3$) and phosphorus oxide ($P_2O_5$) and the metal halides are limited to lithium chloride and potassium chloride.

14. The battery of claim 1, wherein the oxygen ion conducting electrolyte contacts the anode and the cathode.

15. The battery of claim 1, wherein the oxygen ion conducting electrolyte contacts the elemental metal.

16. The battery of claim 1, wherein the elemental metal is molten at the operating temperature of the battery.

17. The battery of claim 1, wherein the elemental metal is molten at the operating temperature of the battery.

18. The battery of claim 17, wherein the oxygen ion conducting electrolyte contacts the elemental metal and the cathode.

19. A battery, comprising:
a cathode configured to generate oxygen ions during discharge of the battery;
a solid oxygen ion conducting electrolyte positioned to receive the oxygen ions from the cathode during discharge of the battery; and
an anode including a liquid anode active medium positioned in the pores of a porous anode current collector such that the anode active medium receive the oxygen ions conducted through the oxygen ion conducting electrolyte during discharge of the battery,
the anode active medium including an elemental metal that reacts with the oxygen ions to form a metal oxide during discharge of the battery.

20. The battery of claim 19, wherein:
the cathode is exposed to air;
the anode active medium includes liquid lithium; and
the oxygen ion conducting electrolyte contacts the porous current collector.

* * * * *